United States Patent [19]

Held

[11] 4,193,342
[45] Mar. 18, 1980

[54] SLIDING SURFACE SEAL ON CONTINUOUS LAMINATING MACHINES

[76] Inventor: Kurt Held, Alte Str. 1, D-7218 Trossingen 2, Fed. Rep. of Germany

[21] Appl. No.: 906,344

[22] Filed: May 15, 1978

[30] Foreign Application Priority Data

May 17, 1977 [DE]  Fed. Rep. of Germany ....... 2722197

[51] Int. Cl.² ............................................. B30B 5/06
[52] U.S. Cl. .............................. 100/154; 100/93 RP; 156/555; 156/583.5; 308/3.5; 308/9; 425/371
[58] Field of Search ................... 100/153, 154, 93 RP; 156/582, 583.5, 555; 277/3, 27, 237 R, DIG. 7; 308/3.5, 9, DIG. 1; 425/371, 405

[56] References Cited

U.S. PATENT DOCUMENTS

| | | | |
|---|---|---|---|
| 2,135,763 | 11/1938 | Nicholson | 100/151 X |
| 2,578,551 | 12/1951 | Hornbost et al. | 162/371 |
| 3,300,374 | 1/1967 | Baker et al. | 162/371 |
| 3,620,158 | 11/1971 | Torelli et al. | 100/154 |
| 4,025,272 | 5/1977 | Camp | 100/154 |

FOREIGN PATENT DOCUMENTS

2421296  11/1975  Fed. Rep. of Germany .

Primary Examiner—Peter Feldman
Attorney, Agent, or Firm—Haseltine, Lake & Waters

[57] ABSTRACT

A sliding surface seal on continuous laminating machines, with object to be laminated placed between two endlessly rotating bands. Pressure is built up on backside of these bands facing away from the object, by fluid in the chambers formed by the bands, by pressure plates fastened in the machine and by sliding seals. These seals are arranged in grooves encircling the edge of the pressure plates by fluid or mechanical pressure or by reaction forces issuing from the pressed object, movable outwardly or inwardly relative to the groove. The seal has U-shaped holding strips and support angles directed laterally or towards the groove bottom on the holding strips to absorb the thrust, acting in the lengthwise direction, and corresponding recesses on the pressure plates issuing from the grooves on both sides of the groove or in the groove bottom. Radial slide bearings of dry sliding material may provide the support surfaces which absorb the friction forces.

6 Claims, 6 Drawing Figures

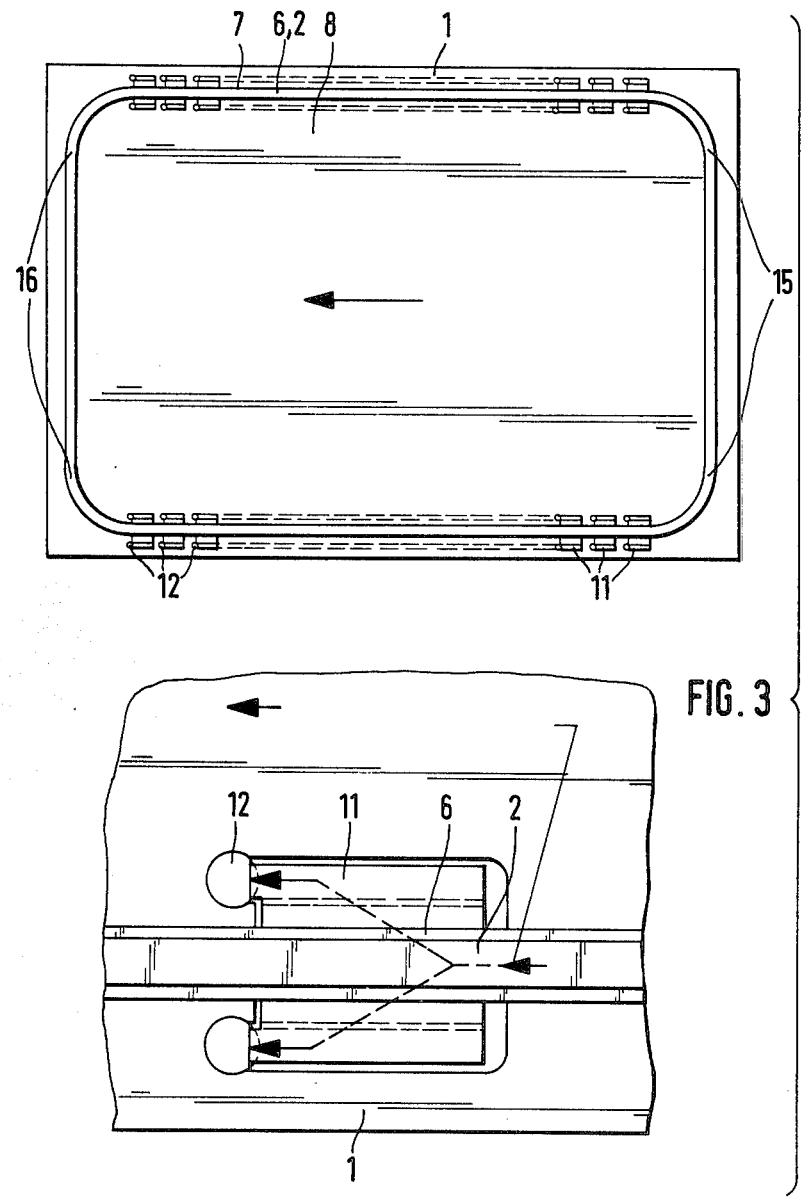

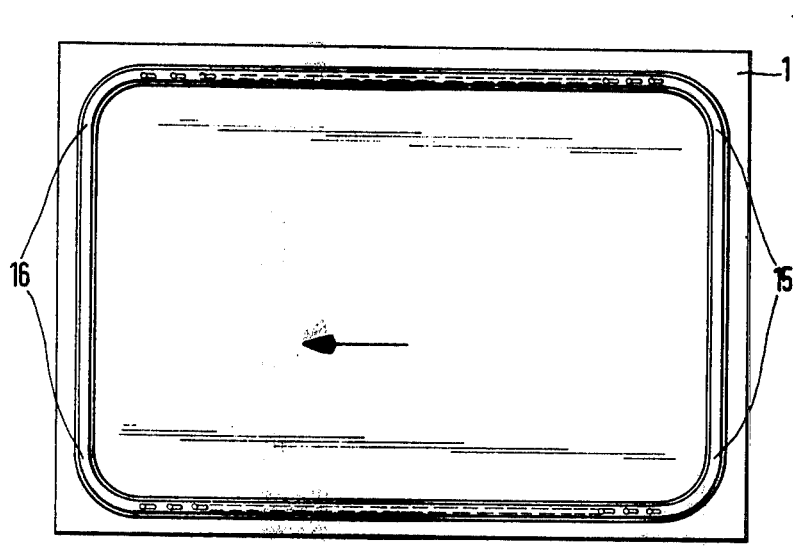
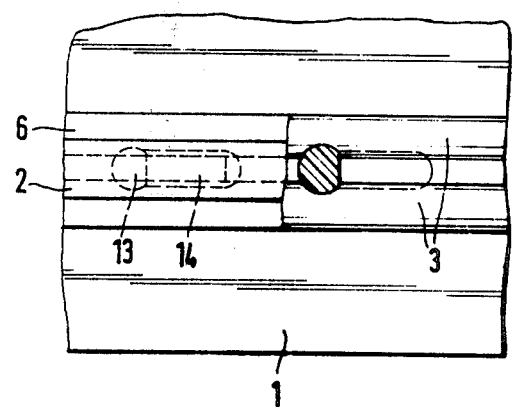
FIG. 6

SLIDING SURFACE SEAL ON CONTINUOUS LAMINATING MACHINES

BACKGROUND OF THE INVENTION

Continuous laminating machines operate preferably with endless impregnation bands of steel or a similar suitable material in such a way that these bands, deflected over rollers, are arranged so that their outsides compress and harden the top or bottom of the impregnated objects under the influence of pressure and temperature. During this process, a negative of the band surface is reproduced on the laminate surface.

To form the reaction zone, a gas or liquid-filled cusion is provided on the two band insides facing each other; this cushion is sealed from the outside against pressure medium losses by gasket sliding on the band insides. This arrangement, representing the state of the art, is known from the U.S. Pat. No. 2,135,763 and from the German Laid-Open Document 24 21 296.

If continuously operating laminating machines with output figures are to be provided which appreciably exceed the output of discontinuously operating installations, because of the time dependence of the hardening processes taking place in the laminate under the influence of heat, long reaction zones and hence long sealing gaps parallel to the feed direction result.

Since with the temperatures above 160 degrees C. customary in hardening, the selection of materials suitable for assuming the sealing function is very small, one must also use those whose friction coefficients are comparatively high. The friction forces occurring with the sliding movement between band rear side and slide sealing material lead to tensile and shear loads which may deform or destroy the seals unduly and set disturbing limits for the application of higher reaction pressures.

SUMMARY OF THE INVENTION

The inventor has set himself the task to remedy these difficulties, i.e., to provide a perfect seal even with high pressures and hence high friction forces and long seals where the seals retain their necessary mobility and still do not move away or are destroyed due to shear load.

BRIEF DESCRIPTION OF THE DRAWINGS

FIG. 3 shows a top view of the pressure plate with the pressure zone enclosed by the seal groove;

FIGS. 4, 5 and 6 show these same views for an embodiment where the space adjacent to the groove is restricted.

DESCRIPTION OF THE PREFERRED EMBODIMENTS

Figure 2:
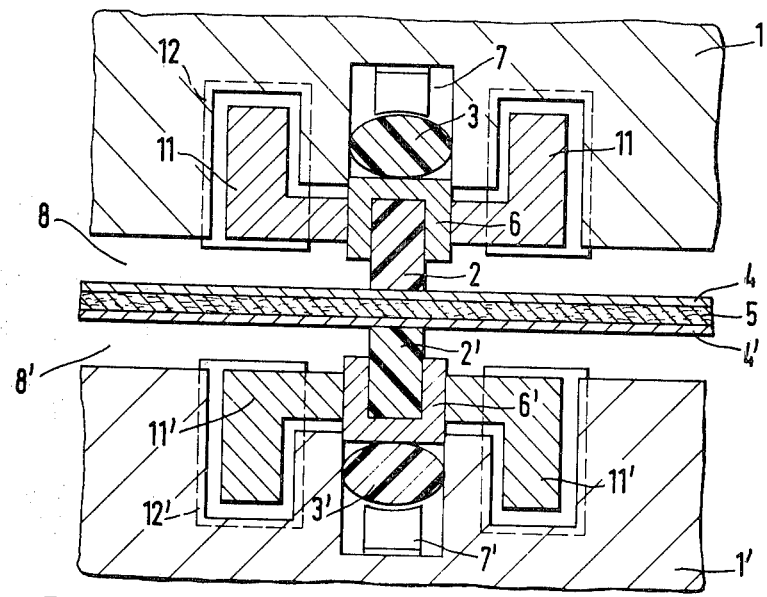
FIG. 2 shows a section similar to that of FIG. 1 taken at right angles to the feed direction.
Figure 1:
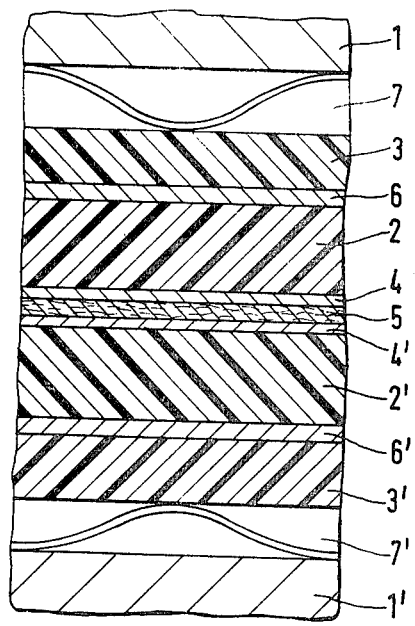
FIG. 1 shows a section taken through a pressure plate arrangement including the sliding surface seal parallel to the feed direction.

FIGS. 1 and 2 show a section through the pressure plates 1,1', the sliding seal 2,2', the stationary seal 3,3' and embossing band 4 parallel or perpendicular to the feed direction. During operation, the impregnation band pair 4,4' moves together with the intermediate laminate 5 in the feed direction past the sliding seal 2,2'. This is held undissolvably in an U-shaped metallic strip 6,6' and seals, as is known, through a fluid pressure medium from the sealing groove 7,7' or pressed by springs against the rear side of the impregnation bands 4,4', the pressure zone 8,8' from the atmosphere on the outside. The pressure plates 1,1' are connected in a known manner by a side closure which receives the reaction forces developing in the cushions (German Laid-Open Document 2,421,296, Item 52).

In order to apply the friction forces acting on seals 2,2' via the strips 6,6' without damaging deformations to the pressure plates 1,1', the invention proposes to attach support angles 11,11' to the legs of strips 6,6' in such a way that the friction forces to be introduced do not exceed the pressures permissible on the radial bearings 12,12' (FIG. 3).

The radial bearings 12,12' permit a movement of seals 2,2' and the strips enclosing them perpendicular to the impregnation band surface and hence their adaptation to changing laminate thickness.

FIG. 3 shows a top view of the pressure plate 1 with the pressure zone 8 enclosed by the seal groove 7, cylindrical radial bearings 12 located on both sides of the seal groove 7 in drill holes, and support angles 11 attached to the U-shaped strip and supported by radial bearing 12.

During continuous lamination, the object to be laminated is guided between two continuously revolving steel bands. These bands exert pressure and apply temperature to the object to be laminated for compression and hardening. The pressure is generated by a fluid which is injected under pressure between the revolving steel band 4 and a fixed pressure plate 1. This requires a lateral sealing between the revolving band 4 and the stationary pressure plate 1.

This sealing poses a problem since the revolving steel band for hardening has an increased temperature of 160°, for example. Therefore, a heat-resistant sealing material must be used. However, the coefficient of friction between such heat-resistant sealing materials and the revolving steel band is high. Because of this high coefficient of friction, the revolving steel band transfers a large force in the direction of motion to the seal which must be pressed with a pressure corresponding to the fluid pressure against the steel band for sealing. These forces produce a high tensile and shear stress on the seal if it is fastened rigidly to the pressure plate, as is the case with conventional laminating machines. These high shear stresses lead to early damage to the seal in the conventional laminating machines so that the machine becomes useless.

Figure 4:
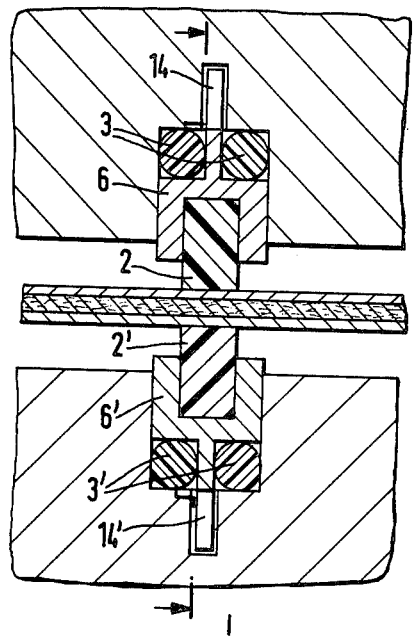
Figure 5:
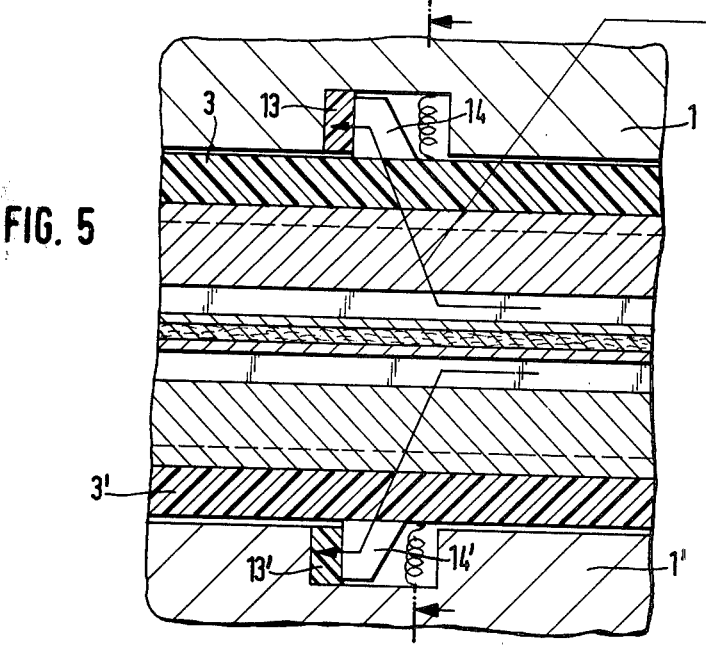

The invention solves this problem by not fastening the seal 2 of heat-resistant material with high coefficient of friction rigidly to pressure plate 1, but seating it in a U-shaped metallic strip 6 which is movable to a limited extent in the direction of motion of steel band 4 against the pressure plate 1. Because of this fastening of seal 2 in the movable strip 6, no large shear forces act on seal 2 so that the life of seal 2 is increased appreciably. The sealing between the metallic strip 6 and the pressure plate 1 is done by seals 3. These seals 3 are not exposed to the high temperature of the steel band 4 so that for these seals 3 a material with low coefficient of friction can be chosen, since it is not excessively stressed by the displacement between strip 6 and the pressure plate 1. The mounting of strip 6 in the pressure plate 1 is accomplished by support angles 11 (FIGS. 1 to 3) and 14 (FIGS. 4 to 6) which engage recesses in the pressure plate 1. In the direction of motion of the steel band 4 and hence in the displacement direction of strip 6, these support angles rest against radial bearings 12 (FIGS. 1 to 3) and 13 (FIGS. 4 to 6). These radial bearings 12 and 13 are cylindrical and placed at right angles to the plane of the steel band 4. This allows a movement of support angles 11 and 14 and hence of strip 6 perpendicular to the pressure plate 1 in order to adapt the seals 2, 2' to different thicknesses of the object to be laminated.

The radial bearings 12, 12', 13, 13' are cylindrical and arranged at right angles to the steel bands 4 and the pressure plates 1 so that the support angles 11, 11' and 14, 14' rest against them in the direction of motion. Form and arrangement of the radial bearings 12 and 13 is shown in FIGS. 2 and 3 and 5 and 6, respectively. The seals 3, 3' are designated as stationary seals and in contrast with the gliding seals 2, 2' they are not displaceable in the direction of motion of steel band 4. A displacement of seals 3, 3' perpendicular to the plane of the steel band 4, 4' is possible to conform to different thicknesses of the laminate. The sealing pressure can be produced by a fluid pressure in grooves 7, 7' (FIGS. 1 and 2) or by spring pressure. The arrows in FIG. 3 show the direction of motion of steel band 4 and the distribution of the shear forces transmitted to seal 2 over the support angles 11. The arrows in FIG. 5 show the path of transmission of the shear forces from the seals 2, 2' via the support angles 14, 14' to the radial bearings 13, 13'.

It is apparent that via each support angle half of the friction forces occurring between two support angles in the lengthwise direction are transferred to the pressure plate, and that this arrangement in accordance with the invention prevents their buildup to magnitudes exceeding the tensile or bending limit of strip 6 and seal 2.

FIGS. 4, 5 and 6 disclose another solution of the problem posed which is expedient when the space adjacent to the groove is restricted: The sliding seal 2,2', the stationary seal 3,3' consisting of two round sections, and the radial bearings are supported by the wall of the groove step located in the feed direction and transfer the friction forces occurring on the sliding seal 2,2' to the pressure plates via the support angles 14,14' attached to the base of the U-shaped strip 6,6'.

The bothersome increased pressures at 15 and 16, FIGS. 3 and 6, located in the case of seals without support elements at the seal portions located at right angles to the feed direction completely disappear in the arrangement of the support elements in accordance with the invention, with the effect that the seals with moving impregnation bands can be applied with small forces to the impregnation band rear side or prove to be easily movable under the effect of laminate thickness variations.

I claim:

1. A sliding surface seal on a continuous laminating machine comprising: two endlessly rotating bands for placing therebetween an object to be laminated; said rotating bands having backsides away from said object; chamber formed by said bands; said chamber holding fluid means for pressure buildup; sliding seals; pressure plates fastened in said machine by said sliding seals; grooves encircling an edge of said pressure plates; said seals being moved in said grooves by pressure means or by reaction forces issuing from said object to be laminated; said seals being movable outwardly or inwardly relative to said groove; U-shaped holding strips rigidly enclosing said sliding seals; support angles on said holding strips for absorbing thrust acting in a lengthwise direction; recesses on said pressure plates, said recesses emanating from said grooves and corresponding to said holding strips and said support angles on both sides of said groove.

2. A sliding surface seal as defined in claim 1 including radial slide bearing means of dry sliding materials; and support surfaces for absorbing friction forces.

3. A sliding surface seal as defined in claim 1 wherein said seals are moved in said grooves by fluid pressure means.

4. A sliding surface seal as defined in claim 1 wherein said seals are moved in said grooves by mechanical pressure means.

5. A sliding surface seal as defined in claim 1 wherein said support angles are directed laterally with respect to the groove bottom.

6. A sliding surface seal as defined in claim 1 wherein said support angles are directed towards the bottom of said grooves.

* * * * *